US012459208B2

(12) United States Patent
Embery et al.

(10) Patent No.: US 12,459,208 B2
(45) Date of Patent: Nov. 4, 2025

(54) METHOD FOR AUTOMATED TREATING OF 3D SURFACES

(71) Applicant: EFFUSIONTECH IP PTY LTD, Dandenong South (AU)

(72) Inventors: Lyell Embery, Dandenong South (AU); Benjamin Saunders, Dandenong South (AU); Louis Ciancullo, Dandenong South (AU); Steven Camilleri, Dandenong South (AU)

( * ) Notice: Subject to any disclaimer, the term of this patent is extended or adjusted under 35 U.S.C. 154(b) by 509 days.

(21) Appl. No.: 17/996,059

(22) PCT Filed: Mar. 31, 2021

(86) PCT No.: PCT/AU2021/050295
§ 371 (c)(1),
(2) Date: Oct. 12, 2022

(87) PCT Pub. No.: WO2021/195707
PCT Pub. Date: Oct. 7, 2021

(65) Prior Publication Data
US 2023/0202115 A1 Jun. 29, 2023

(30) Foreign Application Priority Data
Apr. 1, 2020 (AU) ................. 2020901011

(51) Int. Cl.
*B29C 64/393* (2017.01)
*B25J 9/16* (2006.01)
(Continued)

(52) U.S. Cl.
CPC ........... *B29C 64/393* (2017.08); *B25J 9/1664* (2013.01); *B29C 64/153* (2017.08);
(Continued)

(58) Field of Classification Search
CPC ... B29C 64/393; B29C 64/153; B29C 64/209; B29C 64/268; B33Y 10/00; B33Y 30/00;
(Continued)

(56) References Cited

U.S. PATENT DOCUMENTS

| 4,773,025 A | 9/1988 | Penkar et al. |
| 5,197,013 A | 3/1993 | Dundorf |

(Continued)

OTHER PUBLICATIONS

Sheng, W., et al., Tool Patent Planning for Compound Surfaces in Spray Forming Processes, IEEE Transactions on Automation Science and Engineering, vol. 2, No. 3, pp. 240-249, Jul. 2005.

*Primary Examiner* — Rami R Okasha
(74) *Attorney, Agent, or Firm* — WELSH FLAXMAN & GITLER LLC

(57) ABSTRACT

A method of treating the surface of a 3D object, comprising obtaining a digital 3D shape representation defining characteristics of the object; using a computerised device to convert the 3D shape representation into a digital 2D shape representation defining the 3D surface of the object as it if laid out flat; using the computerised device to generate a digital 2D tool path representation defining movements an applicator or removal tool would take to treat the surface of the shape defined by the 2D shape representation; using the computerised device to convert the 2D tool path representation to a digital 3D tool path representation defining movements that the applicator or removal tool will take to deposit material on, or remove it from, the surface to treat the 3D object; and using the 3D tool path representation to control the applicator tool or removal tool to treat the 3D object.

16 Claims, 2 Drawing Sheets

(51) Int. Cl.
  *B29C 64/153* (2017.01)
  *B29C 64/209* (2017.01)
  *B29C 64/268* (2017.01)
  *B33Y 10/00* (2015.01)
  *B33Y 30/00* (2015.01)
  *B33Y 50/02* (2015.01)
  *G06T 17/30* (2006.01)

(52) U.S. Cl.
  CPC .......... *B29C 64/209* (2017.08); *B29C 64/268* (2017.08); *G06T 17/30* (2013.01); *B33Y 10/00* (2014.12); *B33Y 30/00* (2014.12); *B33Y 50/02* (2014.12); *G05B 2219/40519* (2013.01)

(58) Field of Classification Search
  CPC ......... B33Y 50/02; B33Y 50/00; B33Y 40/20; B05B 12/16; B05B 13/0431; B22F 10/25; C23C 4/01; C23C 4/12; C23C 4/185; C23C 24/04; C23C 24/10; B24C 3/32; G05B 19/4097; G05B 2219/35134; G05B 19/40932; G05B 2219/49007; G05B 2219/49017; G05B 2219/40519; G05B 2219/45013; G05B 2219/45062; G05B 19/19; Y02P 10/25; Y02P 90/02; B25J 9/1664; B25J 9/1671; B25J 11/0055; B25J 11/0075; G06T 19/00; G06T 2200/04; G06T 2219/021; G06T 2219/2008; G06T 2219/2021; G06T 17/30

See application file for complete search history.

(56) References Cited

U.S. PATENT DOCUMENTS

| | | | |
|---|---|---|---|
| 9,952,585 B2* | 4/2018 | Walker | G05B 19/4099 |
| 2011/0169828 A1* | 7/2011 | Pedersen | G06T 17/20 |
| | | | 345/423 |
| 2012/0205356 A1* | 8/2012 | Pluss | B23K 26/0884 |
| | | | 219/121.72 |
| 2014/0088746 A1* | 3/2014 | Maloney | G05B 19/4099 |
| | | | 700/97 |
| 2015/0159257 A1* | 6/2015 | Lin | B23K 26/147 |
| | | | 118/724 |
| 2015/0251357 A1 | 9/2015 | Jin et al. | |
| 2015/0362914 A1* | 12/2015 | DeSimone | B24C 3/00 |
| | | | 700/118 |
| 2016/0311165 A1 | 10/2016 | Mark et al. | |
| 2017/0080438 A1* | 3/2017 | Storr | B05B 13/0431 |
| 2017/0287685 A1* | 10/2017 | Ferrasse | C23C 24/106 |
| 2019/0009472 A1 | 1/2019 | Mark | |
| 2021/0103266 A1* | 4/2021 | Brooks, Jr. | G05B 19/4207 |
| 2021/0125749 A1* | 4/2021 | Martin | H01B 13/01209 |
| 2021/0287451 A1* | 9/2021 | Baudisch | G06T 19/20 |

* cited by examiner

METHOD FOR AUTOMATED TREATING OF 3D SURFACES

FIELD OF THE INVENTION

This invention relates to a method for generating a 3D tool path and using this to control a tool to treat the surface of a 3D object.

BACKGROUND

It is known to treat the surface of 3D objects by adding or subtracting material, for example using an applicator that incorporates a cold spray nozzle, or a grit-blasting nozzle. This process can be automated, for example by using a computer-controlled robot to actuate the tool. Before this can be done the automated system has to be given a tool path to follow, for example to control where, and how much, spray material is applied. A problem with developing the tool path is that it can be an inconveniently complex process.

OBJECT OF THE INVENTION

It is an object of preferred embodiments of the invention to go at least some way towards addressing the above problem. While this applies to preferred embodiments, the object of the invention per se is simply to provide a useful choice. Therefore, any objects or advantages applicable to preferred embodiments should not be taken as a limitation on claims expressed more broadly.

DEFINITIONS

The term "comprising" or "has", as used in this document in relation to a series of features, means they are present as a minimum combination but does not rule out the option of there being additional features. The same applies to related terms such as "comprises" or "having".

SUMMARY OF THE INVENTION

According to an aspect of the invention there a method of automatically treating the surface of a 3D object, comprising the steps of:
a) obtaining or producing a digital 3D shape representation that defines the characteristics of the 3D object;
b) using a computerised device to convert the 3D shape representation into a digital 2D shape representation that defines the 3D surface of the object as it would be if laid out flat;
c) using the computerised device to generate a digital 2D tool path representation defining movements that an applicator or removal tool would have to take to treat the surface of the shape defined by the 2D shape representation; and
d) using the computerised device to convert the 2D tool path representation to a digital 3D tool path representation defining movements that the applicator or removal tool will take to deposit the material on, or remove it from, the surface to treat the 3D object; and
e) using the 3D tool path representation to control the applicator tool or removal tool to move according to the 3D tool path to treat the 3D object.

Optionally the computerised device:
a) defines the 3D representation in terms of a notional 3D mesh;
b) applies an unwrapping transform to notionally situate an element of the 3D mesh in 2D space to notionally identify a 2D sub-surface, and registers the transform against that element;
c) identifies a notional mesh element adjacent to the first element in step b);
d) repeats step c) and d) until there are no further adjacent notional mesh elements available;
e) identifies another untransformed mesh element in the 3D mesh;
f) repeats steps b) through f) until there are no untransformed mesh elements in the 3D mesh;
g) generates a toolpath suitable to treat a notional 2D surface, such surface comprising a collection of the 2D sub-surfaces, and registers each 2D sub-surface with a respective segment of the toolpath; and
h) applies the inverse of the unwrapping transforms registered in step b) to each of the toolpath segments.

Optionally each next mesh element of step d) in the paragraph immediately above to be transformed is selected on a weighting based on largest size and lowest angular misalignment with the previous mesh element.

Optionally the selection criteria for the next element are applied in combination using a numerical weighting.

Optionally wherein the numerical weighting is user adjustable.

Optionally the computerised device executes an optimisation algorithm to determine an efficient toolpath sequence to notionally coat the 2D surface.

Optionally the computerised device selects the mesh element at step b) by:
a) identifying the largest flat face on the 3D model; and
b) identifying the largest mesh element on that face.

Optionally the applicator tool comprises a cold spray nozzle.

Optionally the applicator tool comprises a spray painting nozzle.

Optionally the removal tool comprises a sandblasting nozzle.

Optionally the applicator tool comprises a weld deposition torch.

Optionally where the applicator tool comprises a direct energy deposition system (eg a laser powder deposition or electron beam powder deposition system).

Optionally where the applicator tool comprises a thermal spray nozzle.

Optionally where the removal tool comprises a water jet blaster.

Optionally the removal tool comprises a laser caving or laser ablation tool.

Optionally the removal tool comprises a rotating cutting tool (for example a cutting tool mounted in a CNC machine tool or in an industrial die-grinding tool).

DRAWINGS

Some preferred embodiments of the invention will now be described with reference to the accompanying drawings, of which:

DETAILED DESCRIPTION

In a preferred embodiment of the invention there is a method for the automated treating of complex, arbitrary 3D surfaces, involving an automated electro-mechanical tool system controlled by a computer that generates a tool path. The treatment of the surface consists of adding or subtracting one or more layers of material on or from the surface. In the case of additive treatments, the tool may be a cold spray nozzle, a thermal spray nozzle, a welding head, a direct energy deposition device, a spray paint nozzle, or other similar systems that deposit a layer of material when traversed across a surface. In the case of a subtractive treatment, the tool may be a grit-blasting nozzle, laser caving or laser ablation tool, or a rotating cutting tool such as a mill tool or a die-grinding tool. This method preferably includes the use of a computer to automatically generate a non-trivial 3D toolpath that treats the surface.

Figure 1:
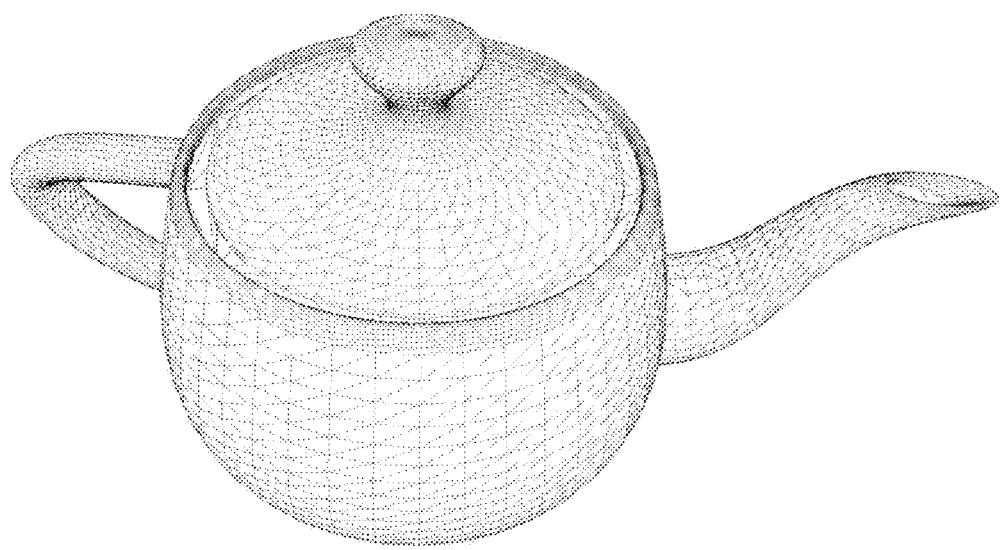
FIG. 1 illustrates a surface boundary mesh presentation for a 3D object, being a tea pot.

In the preferred embodiment, a digital 3D shape representation is obtained or produced and this defines the 3D contour of an object to be worked on. It may be expressed in terms of a boundary representation defining a 3D mesh, composed of a plurality of subset triangular or other-shaped mesh cells. This is exemplified in FIG. 1 for a tea pot.

In some instances, the treatment may be applied to only part of the object because, for example, it is held by a clamping mechanism such that the clamped portion is not exposed to incoming spray material. In this regard the 3D shape representation may incorporate data defining a 'mask', or in other words zones of the object that are to receive spray material as distinct from those that are not.

A computerised device starts with the 3D shape representation and selects from it data (3D subset data) that defines part of the surface contour of the 3D object, for example one or more of the triangular or other shaped cells. This 3D subset data may be chosen according to preferred metrics or strategies e.g. the largest and/or flattest surface of the object, etc. The computerised device may be a single machine or a collection of machines. It may for example comprise a computer proper, or a suitable alternative machine that runs under the control of firmware and/or software.

Next, the computerised device uses the 3D subset data to generate digital data (2D subset data) that represents the corresponding 3D portion of the object when laid out flat (i.e. a 2D representation), eg when "unfolded". This may for example be achieved by subjecting the 3D subset data to a UV unwrapping process running on the computerised device. An analogy of this would be to peel an item of fruit such as an orange or banana, and lay the peel flat on a table. Where it is impossible or impractical to keep the peel connected, then separate islands may be formed by breaking the peel into pieces so that the resultant peelings can be laid completely flat. The peel when laid out flat may of course have height, not just width and length, but can nonetheless be regarded as a 2D representation.

Figure 2:
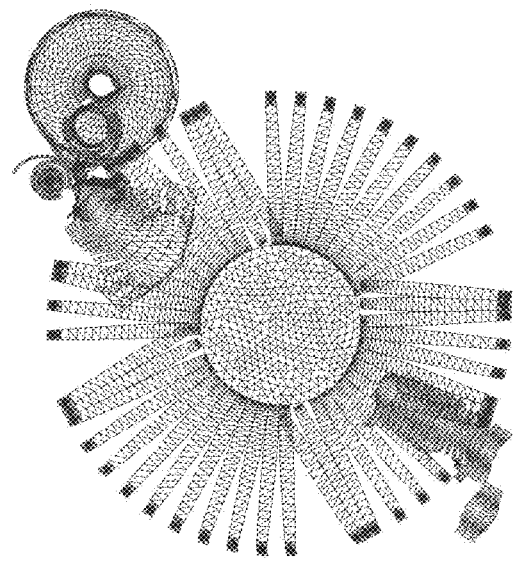
FIG. 2 illustrates the boundary mesh representation when 'unfolded' and laid out flat.

The process of selecting 3D subset data, and using it to generate 2D subset data is repeated for other parts of the object until all desired parts are done. The result is that the exterior surface area of the 2D representation is the same as the exterior surface area applicable to the 3D representation. FIG. 2 exemplifies a 2D representation for the tea pot of FIG. 1.

The step of computerised UV unwrapping is known in the field of 3D graphics and consists of determining and applying an automated set of adjustments, known as transforms, to the 3D subset data in order obtain the 2D subset data and therefore the overall 2D representation. The UV unwrapping in a sense aligns or flattens the 3D representation into a 2D plane while preserving the relationship between subsets of the 3D representation. Put another way, the computerised device generates data that identifies (notionally locates) parts of the 3D representation, and elements relevant to 3D co-ordinate space are systematically adjusted or converted to generate data that identifies (notionally locates) the same parts in 2D co-ordinate space. The 2D representation incorporates data that represents 2D co-ordinate axes, typically designated axis U and axis V, hence the term "UV unwrapping". It will be appreciated by one skilled in the art that a transform consists of an ordered set, or matrix, of numbers that are systematically applied to numbers that define the mesh element in 3D space. It will likewise be appreciated by one skilled in the art that the UV unwrapping process develops a set of transforms, each one of which is singular and specific to the mesh cell or group of mesh cells that it applies to. Thus, the term "unwrapping transform" can be used to mean "the specific rotational transform that has the effect of rotating a mesh element around its common edge with a preceding mesh element, to the extent necessary to make it co-planar with that preceding mesh element".

Preferentially, the UV unwrapping process is achieved by using the computerised device to perform the following steps:

Step 1

The computerised device scans data representative of the 3D mesh to identify a single mesh element (one or more mesh cells) for the surface to be worked on. This mesh element can be defined according to various metrics or strategies i.e. the largest surface, at random etc. It will be appreciated by those skilled in the art that it is advantageous to identify a large mesh element with low misalignment with its neighbours, although the method will work with other mesh elements chosen first.

Step 2

The computer converts the chosen 3D mesh element to a 2D representation by determining the unwrapping transform that converts the 3D data of that mesh element to a 2D data representation. The converted form of the mesh now lies flat on a desired 2D plane and has substantially the same area as the original 3D element. Notably, the computerised device records this unwrapping transform and registers it against the mesh element it was applied to.

Step 3

After converting the chosen mesh element to a 2D representation, the computerised device identifies an adjacent mesh element-eg an element that shares an edge with the previously unfolded mesh element, to which the transform process is then applied. The computerised device prioritises the adjacent mesh element which has the longest shared edge and/or is on the least acute angle with the previously unfolded element. It will be appreciated by those skilled in the art that other methods of choosing adjacent elements for unwrapping are possible, with different but generally inferior results.

Step 4

The computerised device repeats step 3, unfolding successive adjacent mesh elements, until all possible adjacent elements have been transformed into 2D space.

Step 5

Following this, the computerised device restarts the entire process (back to Step 1), selecting a new mesh element that hasn't already been transformed. This is repeated until all mesh elements of the 3D model that require surface treatment have been transformed to their 2D representations. The result will be either a single connected 2D plethora of coplanar mesh elements or a set of isolated 2D islands, each consisting of a plethora of elements.

Thus, in the manner described above, the computerised device processes all of the 3D subset data and generates digital data (overall 2D skin data) that represents a connected mosaic of all, or sets ("islands'), of 2D representations. In cases where all of the 2D representations are connected, they may approximate the entire 'skin' of the 3D object when laid out flat. In cases where the 2D representations consist of a series of 'islands', each island represents a zone or piece of the entire skin.

The computerised device processes the overall 2D skin data to generate electronic data (2D tool path data) representing a 2D tool path that defines relative movements between the nozzle and the unfolded surface as it is treated.

It will be appreciated by those skilled in the art that a variety of modified 'travelling salesman' algorithms may be used to generate the 2D toolpath; in other words, to efficiently and evenly traverse the 2D surface and apply the treatment in the manner desired. This kind of problem is defined as "NP" complete and requires substantial computation in two dimensions, but is significantly simpler than if it were performed in three dimensions (i.e. prior to an unwrapping transform).

A raster type 2D toolpath (ie traversing in, for example, the X axis, then indexing one pixel in the Y axis) is an example of a toolpath known to those skilled in the art that may be so generated. The tool path may be represented by a variety of different mathematically-conventional ordered formats, for example, line segments, vectors or coordinates. As will be appreciated, the tool path for the 2D representation may be characterised as a collection of smaller tool path segments where each segment deals with the treatment applied to a separate portion of the surface.

The result of this is that each mesh element in 2D space now has a corresponding toolpath, such that a given mesh element is treated by a specific 'segment' of the toolpath. In this the toolpath may be divided into various segments that each correspond to a given mesh element.

Figure 3:
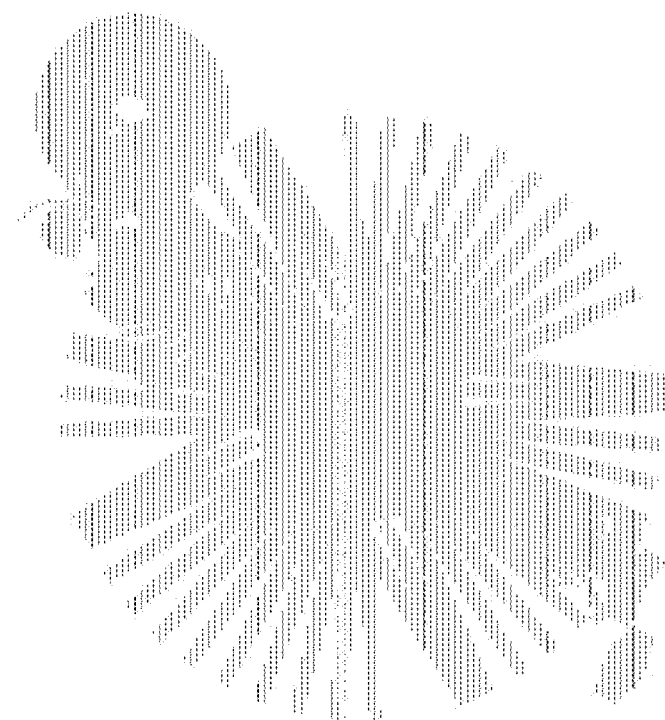
FIG. 3 illustrates a 2D Raster tool path projected across the unfolded mesh of FIG. 2.

FIG. 3 exemplifies a 2D tool path for the tea pot referred to above. The outline of each of the mesh islands is shown, with the lines across them representing the path of a tool in 2D space required to treat them correctly. The lines represent a rastering strategy, although other solutions to the problem of evenly treating the 2D surface may be employed.

The computerised device then processes the 2D tool path to generate electronic data (3D tool path data) representing the movement of the tool in 3D space that defines relative movements between the tool and the real object in order to correctly treat the surface. This may for example be achieved by subjecting the 2D tool path data to an 'inverse geometric transformation' process running on the computerised device. The computerised device in essence applies the inverse of the transform associated with each mesh element to the toolpath vector associated with that element. This converts the 2D data of the toolpath into the 3D object space, while preserving the relationship between the tool and each mesh element.

The 3D tool path data is used in the treatment process, which incorporates the tool and a workpiece-holding clamp, to control relative movement between the tool and object, the treatment time, speed and any other parameters for each part of the object so that the object is treated to the desired characteristics, for example thickness.

Figure 4:
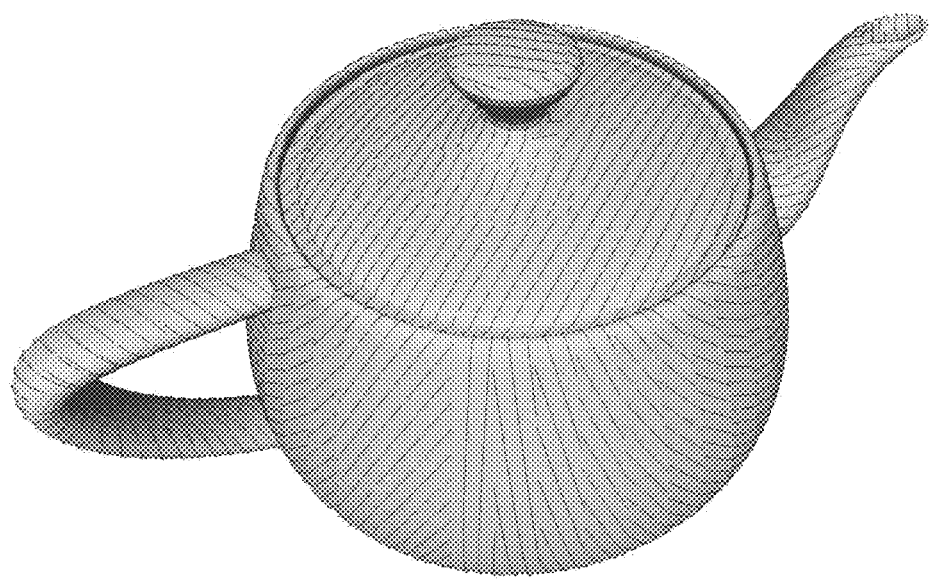
FIG. 4 illustrates a projected 3D tea pot after using the 3D tool path to control a cold spray applicator.

FIG. 4 which represents the tea pot when treated, with the toolpath transformed into 3D space and shown on the surface of the object. In this regard various known software driven methods may be employed for bringing about the relative movement between the tool and the object. These include a variety of industrial and proprietary systems for the control of robots or other multi-axis mechanisms like CNC machine tools.

In a preferred embodiment, the computerised device, having completed step 5 above, proceeds as follows:

Step 6

Once the computer has completely processed the 3D surface to be treated into a 2D island or set of islands, the toolpath is generated, for example by applying a rastering strategy. The computer scans the 2D toolpath data and divides it into segments corresponding to each mesh element it covers.

Step 7

The computer then generates the inverse transform for each mesh element and applies it to the associated toolpath segment to convert the 2D toolpath into the 3D space that the mesh surface occupies. The complete toolpath is the concatenation of these segments in 3D space.

Step 8

The computer then exports the toolpath to the proprietary interface of the mechanism that actuates the tool, for instance a robot or CNC machine.

In some embodiments, the nozzle and clamp may together form components of a cold spray applicator. Either one or both of these may move in three dimensions to control the build-up of spray material as the object forms.

In other embodiments of the invention the cold spray apparatus may be substituted by sandblaster apparatus so that the object is formed by sand blast removing material from an item (e.g. from a previously formed product).

In still further embodiments the cold spray apparatus may be substituted by any of a paint spray apparatus, incorporating a paint spray nozzle, a mill or other machine deploying a rotating cutting tool, a laser caving or ablation device, a direct energy deposition device for the application of powders, or a thermal spray device.

While in preferred embodiments the 3D representation and the 2D representation are for the object before it is treated or otherwise worked on to add or remove material, in other embodiments these representations may be for the object after it has been treated or otherwise worked on. In such cases the tool path for each is determined in substantially the same way described above, but with appropriate adjustment to account for the fact that the representations are for the finished item.

While some preferred embodiments of the invention have been described by way of example it should be appreciated that modifications and improvements can occur without departing from the scope of the following claims.

In terms of disclosure, this document hereby discloses each item, feature or step mentioned herein in combination with one or more of any of the other item, feature or step disclosed herein, in each case regardless of whether such combination is claimed.

The invention claimed is:

1. A method of automatically treating a surface of a 3D object, comprising the steps of:
   a) obtaining or producing a digital 3D shape representation that defines characteristics of the 3D object;
   b) using a computerized device to convert the 3D shape representation into a digital 2D shape representation that defines the surface of the 3D object as it would be if laid out flat;
   c) using the computerized device to generate a digital 2D tool path representation defining movements that an applicator or removal tool would have to take to treat a surface of the shape defined by the 2D shape representation;
   d) using the computerized device to convert the 2D tool path representation to a digital 3D tool path representation defining movements that the applicator or removal tool will take to deposit material on, or remove it from, the surface to treat the 3D object; and
   e) using the 3D tool path representation to control the applicator tool or removal tool to move according to the 3D tool path to treat the 3D object;
   wherein the computerized device further:
      i) defines the 3D representation in terms of a notional 3D mesh;
      ii) applies an unwrapping transform to notionally situate an element of the 3D mesh in 2D space to notionally identify a 2D sub-surface, and registers the transform against that element;
      iii) identifiers a notional mesh element adjacent to the element in step ii);
      iv) repeats steps ii and iii) until there are no further adjacent notional mesh elements available, whereby each next notional mesh element is selected on a weighting based on largest size and lowest angular misalignment with a previous notional mesh element;
      v) identifies another untransformed mesh element in the 3D mesh;
      vi) repeats steps ii) through v) until there are no untransformed mesh elements in the 3D mesh;
      vii) generates a toolpath suitable to treat a notional 2D surface, such surface comprising a collection of the 2D sub-surfaces, and registers each 2D subsurface with a respective segment of the tool path; and
      viii) applies an inverse of the unwrapping transforms registered in step ii) to each of the tool path segments.

2. The method of claim 1, wherein a selection criteria for the next notional mesh element of step iv) are applied in combination using a numerical weighting.

3. The method of claim 2, wherein the numerical weighting is user adjustable.

4. The method of claim 1, where the computerized device executes an optimization algorithm to determine an efficient toolpath sequence to notionally coat the 2D surface.

5. The method of claim 1, wherein the computerized device selects the mesh element at step ii) of claim 1 by:
   a) identifying the largest flat face on the 3D model; and
   b) identifying the largest mesh element on that face.

6. The method of claim 1, where the applicator tool comprises a cold spray nozzle.

7. The method of claim 1, where the applicator tool comprises a spray painting nozzle.

8. The method of claim 1, where the removal tool comprises a sandblasting nozzle.

9. The method of claim 1, where the applicator tool comprises a weld deposition torch.

10. The method of claim 1, where the applicator tool comprises a direct energy deposition system.

11. The method of claim 10, wherein the direct energy deposition system is a laser powder deposition system.

12. The method of claim 10, wherein the direct energy deposition system is an electron beam powder deposition system.

13. The method of claim 1, where the applicator tool comprises a thermal spray nozzle.

14. The method of claim 1, where the removal tool comprises a water jet blaster.

15. The method of claim 1, where the removal tool comprises a laser caving or laser ablation tool.

16. The method of claim 1, where the removal tool comprises a rotating cutting tool.

* * * * *